US011371244B2

(12) United States Patent
Bai et al.

(10) Patent No.: US 11,371,244 B2
(45) Date of Patent: Jun. 28, 2022

(54) HIGH SOLAR-REFLECTIVITY ROOFING GRANULES UTILIZING LOW ABSORPTION COMPONENTS

(71) Applicants: 3M INNOVATIVE PROPERTIES COMPANY, St. Paul, MN (US); Feng Bai, Woodbury, MN (US); Kenton D. Budd, Woodbury, MN (US); Rebecca L. Everman, St. Paul, MN (US); Craig W. Lindsay, Minneapolis, MN (US)

(72) Inventors: Feng Bai, Woodbury, MN (US); Kenton D. Budd, Woodbury, MN (US); Rebecca L. Everman, St. Paul, MN (US); Craig W. Lindsay, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/396,197

(22) PCT Filed: Apr. 8, 2013

(86) PCT No.: PCT/US2013/035551
§ 371 (c)(1),
(2) Date: Oct. 22, 2014

(87) PCT Pub. No.: WO2013/165650
PCT Pub. Date: Nov. 7, 2013

(65) Prior Publication Data
US 2015/0113901 A1    Apr. 30, 2015

Related U.S. Application Data

(60) Provisional application No. 61/640,462, filed on Apr. 30, 2012.

(51) Int. Cl.
| | |
|---|---|
| *E04D 1/28* | (2006.01) |
| *E04D 7/00* | (2006.01) |
| *C09D 1/00* | (2006.01) |
| *C09D 1/06* | (2006.01) |
| *C09D 5/33* | (2006.01) |
| *G02B 1/00* | (2006.01) |
| *G02B 1/02* | (2006.01) |
| *E04D 1/00* | (2006.01) |

(52) U.S. Cl.
CPC ............ *E04D 1/28* (2013.01); *C09D 1/00* (2013.01); *C09D 1/06* (2013.01); *C09D 5/004* (2013.01); *E04D 7/005* (2013.01); *G02B 1/00* (2013.01); *G02B 1/02* (2013.01); *E04D 2001/005* (2013.01); *Y02A 30/254* (2018.01); *Y02B 80/00* (2013.01)

(58) Field of Classification Search
CPC ..... E04D 2001/005; E04D 7/005; E04D 1/00; E04D 1/28; C09D 1/00; C09D 1/06; C09D 5/004; G02B 1/00; G02B 1/02; Y02A 30/255; Y02A 30/254; Y02B 80/34; Y02B 80/00
USPC .......................................................... 52/515
See application file for complete search history.

(56) References Cited

U.S. PATENT DOCUMENTS

| | | | | |
|---|---|---|---|---|
| 1,677,701 A | * | 7/1928 | Alton | C04B 20/04 428/404 |
| 1,943,525 A | * | 1/1934 | Gundlach | E04D 7/005 106/426 |
| 2,057,678 A | * | 10/1936 | Gundlach | E04D 7/005 427/218 |
| 2,417,058 A | * | 3/1947 | Buzzell | E04D 7/005 428/145 |
| 2,439,650 A | * | 4/1948 | Cuno | C04B 20/1055 427/219 |
| 2,695,851 A | * | 11/1954 | Lodge | C04B 14/36 428/404 |
| 2,729,574 A | * | 1/1956 | Schwarz | C04B 28/26 428/206 |
| 2,810,660 A | * | 10/1957 | Carpenter | 427/106 |
| 2,981,636 A | * | 4/1961 | Lodge | E04D 7/005 427/214 |
| 3,255,031 A | * | 6/1966 | Lodge | E04D 7/005 427/219 |
| 3,620,819 A | * | 11/1971 | Croce | C04B 41/009 106/733 |
| 3,653,970 A | | 4/1972 | Iles | |
| 3,811,851 A | | 5/1974 | Mackenzie | |
| 3,888,176 A | * | 6/1975 | Horai, Jr. | A01N 25/26 106/18.35 |
| 3,888,682 A | * | 6/1975 | Nelson | A01N 25/26 106/18.35 |
| 3,888,683 A | * | 6/1975 | Horai, Jr. | A01N 25/26 106/18.35 |

(Continued)

FOREIGN PATENT DOCUMENTS

| | | |
|---|---|---|
| CN | 101747029 | 6/2010 |
| CN | 102190445 | 9/2011 |

(Continued)

OTHER PUBLICATIONS

International Search Report for PCT International Application No. PCT/US2013/035551, dated Jun. 27, 2013, 4pgs.

*Primary Examiner* — James M Ference

(57) ABSTRACT

An uncolored roofing granule including a low solar absorption base and a low solar absorption and solar opaque coating presented on the base, the coating including a binder, a pigment, wherein the binder includes a curable component and a non-clay, thermally reactive curing agent.

9 Claims, 7 Drawing Sheets

(56) References Cited

U.S. PATENT DOCUMENTS

| | | | |
|---|---|---|---|
| 3,894,877 A * | 7/1975 | Nelson | C04B 20/12 106/18 |
| 3,900,303 A | 8/1975 | Mackenzie | |
| 3,963,503 A | 6/1976 | Mackenzie | |
| 4,092,441 A * | 5/1978 | Meyer | A01N 59/16 106/18.35 |
| 4,110,085 A | 8/1978 | Balz | |
| 4,218,260 A * | 8/1980 | Metzler | B28B 11/0872 106/676 |
| 4,359,505 A * | 11/1982 | Joedicke | C04B 20/1055 106/286.8 |
| 4,717,614 A * | 1/1988 | Bondoc | E04D 1/26 428/143 |
| 4,764,486 A | 8/1988 | Ishihara | |
| 5,356,664 A * | 10/1994 | Narayan | C09D 5/16 106/18.36 |
| 5,613,995 A | 3/1997 | Bhandarkar | |
| 5,795,389 A * | 8/1998 | Koschitzky | B05C 19/06 118/308 |
| 5,823,661 A | 10/1998 | Mahanay | |
| 6,174,360 B1 | 1/2001 | Sliwinski | |
| 6,194,484 B1 * | 2/2001 | Hugo | C09D 5/32 523/135 |
| 6,454,848 B2 | 9/2002 | Sliwinski | |
| 6,506,248 B1 * | 1/2003 | Duselis | C04B 18/021 106/470 |
| 6,521,038 B2 * | 2/2003 | Yanagimoto | C09B 29/0011 106/493 |
| 6,548,145 B2 * | 4/2003 | Joedicke | C04B 20/1085 428/144 |
| 6,569,520 B1 * | 5/2003 | Jacobs | C04B 41/5041 428/330 |
| 6,818,297 B1 | 11/2004 | Atarashi | |
| 7,031,590 B2 * | 4/2006 | Gasca et al. | 385/142 |
| 7,241,500 B2 | 7/2007 | Shiao | |
| 7,452,598 B2 | 11/2008 | Shiao | |
| 7,455,899 B2 | 11/2008 | Gross | |
| 2002/0160151 A1 * | 10/2002 | Pinault | B05D 5/02 428/144 |
| 2003/0068469 A1 * | 4/2003 | Aschenbeck | D06N 5/00 428/150 |
| 2003/0152747 A1 * | 8/2003 | Fensel | B32B 5/16 428/143 |
| 2004/0110639 A1 * | 6/2004 | Joedicke | A01N 59/20 504/151 |
| 2004/0258835 A1 * | 12/2004 | Hong | E04D 1/20 427/180 |
| 2005/0072110 A1 * | 4/2005 | Shiao | E04D 5/12 52/741.1 |
| 2005/0072114 A1 * | 4/2005 | Shiao | E04D 5/12 52/782.1 |
| 2005/0074580 A1 * | 4/2005 | Gross | C04B 41/4584 428/143 |
| 2006/0016598 A1 | 1/2006 | Urbanek | |
| 2006/0251807 A1 * | 11/2006 | Hong | E04D 5/12 427/212 |
| 2006/0260255 A1 * | 11/2006 | Ganpule | B32B 13/02 52/596 |
| 2007/0065640 A1 * | 3/2007 | Joedicke | C04B 20/1059 428/143 |
| 2007/0065641 A1 * | 3/2007 | Joedicke | C04B 20/1059 428/143 |
| 2007/0148342 A1 * | 6/2007 | Kalkanoglu | A01N 25/12 427/212 |
| 2007/0282039 A1 * | 12/2007 | Smith et al. | 524/59 |
| 2008/0026183 A1 * | 1/2008 | Vanpoulle et al. | 428/143 |
| 2008/0118640 A1 * | 5/2008 | Kalkanoglu | A01N 25/12 427/186 |
| 2008/0160289 A1 * | 7/2008 | Lin | B82Y 30/00 428/327 |
| 2008/0241472 A1 * | 10/2008 | Shiao | C04B 20/12 428/144 |
| 2008/0241516 A1 * | 10/2008 | Hong | C04B 20/1074 428/331 |
| 2008/0261007 A1 * | 10/2008 | Hong | E04D 7/005 428/216 |
| 2009/0131517 A1 * | 5/2009 | Height | A01N 25/12 514/495 |
| 2009/0133738 A1 * | 5/2009 | Shiao et al. | 136/251 |
| 2010/0151198 A1 * | 6/2010 | Khan | B32B 11/02 428/144 |
| 2010/0151199 A1 | 6/2010 | Shiao | |
| 2010/0203336 A1 | 8/2010 | Shiao | |
| 2010/0240526 A1 * | 9/2010 | Hong | B82Y 30/00 502/84 |
| 2011/0008622 A1 * | 1/2011 | Kalkanoglu | C04B 41/5018 428/405 |
| 2011/0041726 A1 * | 2/2011 | Robb et al. | 106/31.13 |
| 2011/0081553 A1 * | 4/2011 | Mehlmann et al. | 428/522 |
| 2011/0086201 A1 | 4/2011 | Shiao | |
| 2011/0112221 A1 * | 5/2011 | Lejeune | C08G 77/14 523/425 |
| 2011/0130062 A1 * | 6/2011 | Squires | B32B 7/02 442/327 |
| 2011/0159240 A1 * | 6/2011 | Shiao et al. | 428/144 |
| 2011/0200823 A1 * | 8/2011 | Shiao | B01J 2/006 428/403 |
| 2011/0223385 A1 * | 9/2011 | Shiao | C04B 20/1033 428/144 |
| 2012/0157583 A1 * | 6/2012 | Shiao | C04B 28/24 524/64 |
| 2012/0164385 A1 * | 6/2012 | Heulings | C08J 3/2053 428/144 |
| 2012/0276369 A1 * | 11/2012 | Jing et al. | 428/331 |
| 2013/0102216 A1 * | 4/2013 | Turner | C08G 18/6229 442/132 |
| 2013/0194668 A1 * | 8/2013 | Liang | C03C 17/22 359/586 |
| 2013/0194670 A1 * | 8/2013 | Liang | B05D 5/063 359/601 |
| 2013/0215513 A1 * | 8/2013 | Liang | G02B 1/11 359/601 |
| 2015/0113901 A1 * | 4/2015 | Bai | E04D 1/00 52/515 |
| 2015/0225957 A1 * | 8/2015 | Tangeman | E04D 7/005 427/215 |
| 2015/0266774 A1 * | 9/2015 | Budd | C03C 12/00 428/402 |

FOREIGN PATENT DOCUMENTS

| | | |
|---|---|---|
| DE | 19740757 | 3/1999 |
| EP | 1072572 | 1/2001 |
| GB | 817636 | 8/1959 |
| GB | 2080149 | 2/1982 |
| JP | S53-57221 | 5/1978 |
| JP | 62-171942 | 7/1987 |
| JP | 60-65745 | 3/1994 |
| JP | 2009-096879 | 5/2009 |
| KR | 2001-0095661 | 11/2001 |
| WO | WO 2000-61496 | 10/2000 |
| WO | WO 2003-055822 | 7/2003 |
| WO | WO 2008-147972 | 12/2008 |
| WO | WO 2009-077589 | 6/2009 |
| WO | WO 2009-136141 | 11/2009 |
| WO | WO 2011-153369 | 12/2011 |
| WO | WO 2012-003449 | 1/2012 |
| WO | WO 2014-042987 | 3/2014 |

* cited by examiner

HIGH SOLAR-REFLECTIVITY ROOFING GRANULES UTILIZING LOW ABSORPTION COMPONENTS

FIELD

The present disclosure generally relates to roofing granules. More particularly, the present disclosure relates to high solar reflectivity roofing granules.

BRIEF SUMMARY

Features and advantages of this disclosure will be understood upon consideration of the detailed description, as well as the appended and claims. These and other features and advantages of the invention may be described below in connection with various embodiments of the present invention. This summary is not intended to describe each and all disclosed embodiments or every implementation of the present invention.

A feature and advantage of the present disclosure is the enablement of roofing having a total solar reflectivity ("TSR") of up to or even greater than 0.70 of the total solar spectrum, moderate to low cost, and sufficient ultraviolet ("UV") blocking for high durability. The subject matter of this disclosure, in its various combinations, either in apparatus or method form, may include the following list of embodiments:

1. An uncolored roofing granule comprising:
a low solar absorption base; and
a low solar absorption and solar opaque coating presented on said base, said coating comprising a binder, a pigment, wherein said binder comprises a curable component and a non-clay, thermally reactive curing agent.

2. The uncolored roofing granule of embodiment 1, wherein said coating is UV blocking.

3. The uncolored roofing granule of embodiment 1, wherein said curable component comprises a soluble silicate.

4. The uncolored roofing granule of embodiment 1, wherein said binder comprises less than about 15% by weight clay.

5. The uncolored roofing granule of embodiment 1, wherein said binder comprises less than about 5% by weight clay.

6. The uncolored roofing granule of embodiment 1, wherein said binder comprises less than about 1% by weight clay.

7. The uncolored roofing granule of embodiment 1, wherein said binder comprises about 0% by weight clay.

8. The uncolored roofing granule of embodiment 1, wherein said coating has high reflectivity to visible and infrared (IR) light.

9. The uncolored roofing granule of embodiment 1, wherein said base is transparent to much of the solar spectrum.

10. The uncolored roofing granule of embodiment 9, wherein said base is selected from the group consisting of recycled glass, engineered glass, quartz, and any combinations thereof.

11. The uncolored roofing granule of embodiment 1, wherein said base comprises high diffuse reflectivity and comprises a total solar reflectivity having a cup brightness of at least about 0.70 reflectivity.

12. The uncolored roofing granule of embodiment 11, wherein said base is selected from the group consisting of polycrystalline silicate, polycrystalline silica, glass ceramic, devitrified ceramic, phase-separated glass, polycrystalline fused oxide, white cement, and any combinations thereof.

13. The uncolored roofing granule of embodiment 11, wherein said base is white cement, said white cement comprising one or more fillers selected from the group consisting of recycled glass, engineered glass, quartz, alumina, titania, and any combinations thereof.

14. The uncolored roofing granule of embodiment 1, wherein said soluble silicate comprises mixed alkali silicate.

15. The uncolored roofing granule of embodiment 1, wherein said reactive curing agent comprises silica nanoparticles dispersed therein.

16. The uncolored roofing granule of embodiment 15, wherein said reactive curing agent further comprises a flux.

17. The uncolored roofing granule of embodiment 16, wherein said flux is selected from the group consisting of soluble borate, soluble phosphate, insoluble borate, insoluble phosphate, nanoparticles, and any combinations thereof.

18. The uncolored roofing granule of embodiment 1, wherein said pigment is selected from the group consisting of alumina, titania, zinc oxide, UV blocking powders, and any combinations thereof.

19. An uncolored roofing granule comprising:
a low solar absorption base; and
a coating presented on said base, said coating comprising a binder and a pigment, wherein said binder comprises a curable component and a non-clay, thermally reactive curing agent comprising silica nanoparticles dispersed therein.

20. The uncolored roofing granule of embodiment 19, wherein said binder comprises less than about 15% by weight clay.

21. The uncolored roofing granule of embodiment 19, wherein said binder comprises less than about 5% by weight clay.

22. The uncolored roofing granule of embodiment 19, wherein said binder comprises less than about 1% by weight clay.

23. The uncolored roofing granule of embodiment 19, wherein said coating has high reflectivity to visible and infrared (IR) light.

24. The uncolored roofing granule of embodiment 19, wherein said base is transparent to much of the solar spectrum.

25. The uncolored roofing granule of embodiment 24, wherein said base is selected from the group consisting of recycled glass, engineered glass, quartz, and any combinations thereof.

26. The uncolored roofing granule of embodiment 19, wherein said base comprises high diffuse reflectivity and comprises a total solar reflectivity having a cup brightness of at least about 0.70 reflectivity.

27. The uncolored roofing granule of embodiment 26, wherein said base is selected from the group consisting of polycrystalline silicate, polycrystalline silica, glass ceramic, devitrified ceramic, phase-separated glass, polycrystalline fused oxide, white cement, and any combinations thereof.

28. The uncolored roofing granule of embodiment 26, wherein said base is white cement, said white cement comprising one or more fillers selected from the group consisting of recycled glass, engineered glass, quartz, alumina, titania, and any combinations thereof.

29. The uncolored roofing granule of embodiment 19, wherein said soluble silicate comprises mixed alkali silicate.

30. The uncolored roofing granule of embodiment 19, wherein said reactive curing agent further comprises a flux.

31. The uncolored roofing granule of embodiment 30, wherein said flux is selected from the group consisting of soluble borate, soluble phosphate, insoluble borate, insoluble phosphate, nanoparticles, and any combinations thereof.

32. The uncolored roofing granule of embodiment 19, wherein said pigment is selected from the group consisting of alumina, titania, zinc oxide, UV blocking powders, and any combinations thereof.

33. A roofing article comprising a substrate and a plurality of roofing granules according to any of the previous embodiments presented on said substrate, said article further comprising an overcoat presented on said substrate and roofing granules.

34. The roofing article of embodiment 33, wherein said overcoat comprises fluorinated polyurethane silane with nanosilica particles dispersed in said fluorinated polyurethane silane.

35. The roofing article of embodiment 33, wherein said overcoat further comprises pigment selected from the group consisting of alumina, titania, zinc oxide, UV blocking powders, and any combinations thereof.

36. The roofing article of embodiment 33, wherein said overcoat further comprises a binder.

37. The roofing article of embodiment 33, wherein said overcoat comprises a second polymer.

38. The roofing article of embodiment 33, wherein said second polymer comprises an acrylic.

39. The roofing article of embodiment 33, wherein said overcoat comprises a first layer comprising acrylic and a second layer presented on said first layer, said second layer comprising fluorinated polyurethane silane with nanosilica particles dispersed in said fluorinated polyurethane silane.

40. The roofing article of embodiment 33, wherein said overcoat comprises a mixture of acrylic and fluorinated polyurethane silane with nanosilica particles dispersed in said fluorinated polyurethane silane.

BRIEF DESCRIPTION OF THE DRAWINGS

The disclosure may be more completely understood, and those having ordinary skill in the art to which the subject invention relates will more readily understand how to make and use the subject invention, in consideration of the following detailed description of various exemplary embodiments of the disclosure in connection with the accompanying drawings, in which.

DETAILED DESCRIPTION

Figure 1:
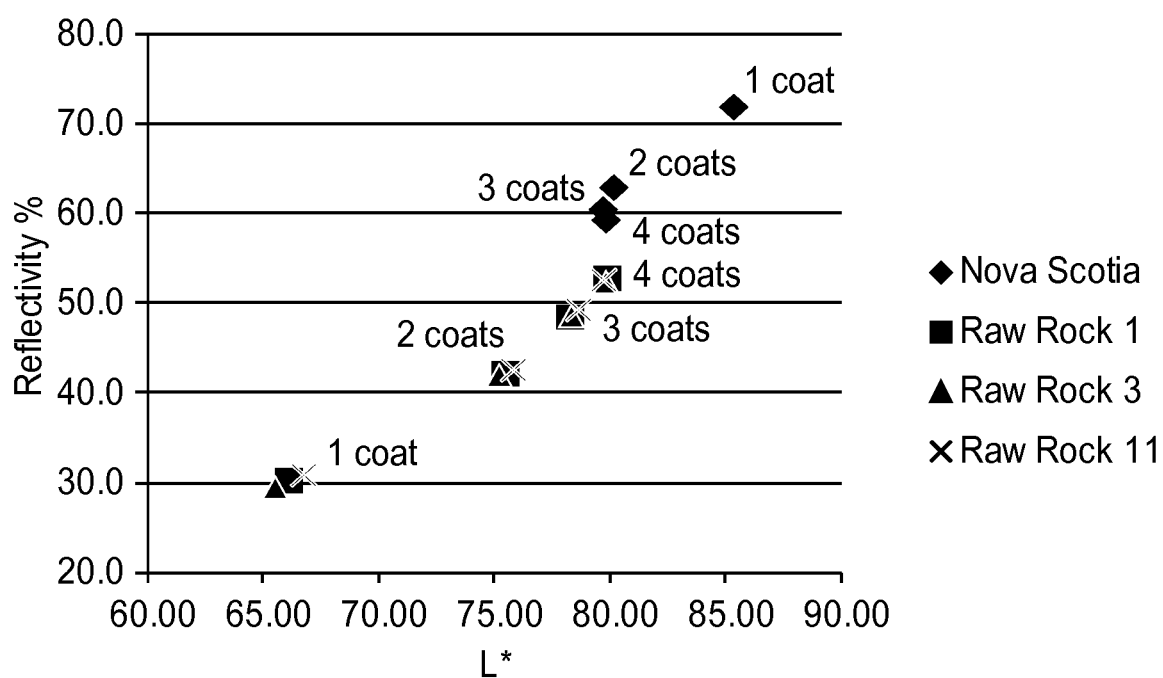
FIG. 1 is a graph depicting reflectivity of various numbers of coatings by base rock versus L* (whiteness on the CIE LAB scale). As more coatings are added the Nova Scotia base and the Raw Rock base approach the same level on the L* scale, but the Nova Scotia base has higher reflectivity by ~10% (0.10 TSR).
Figure 2:
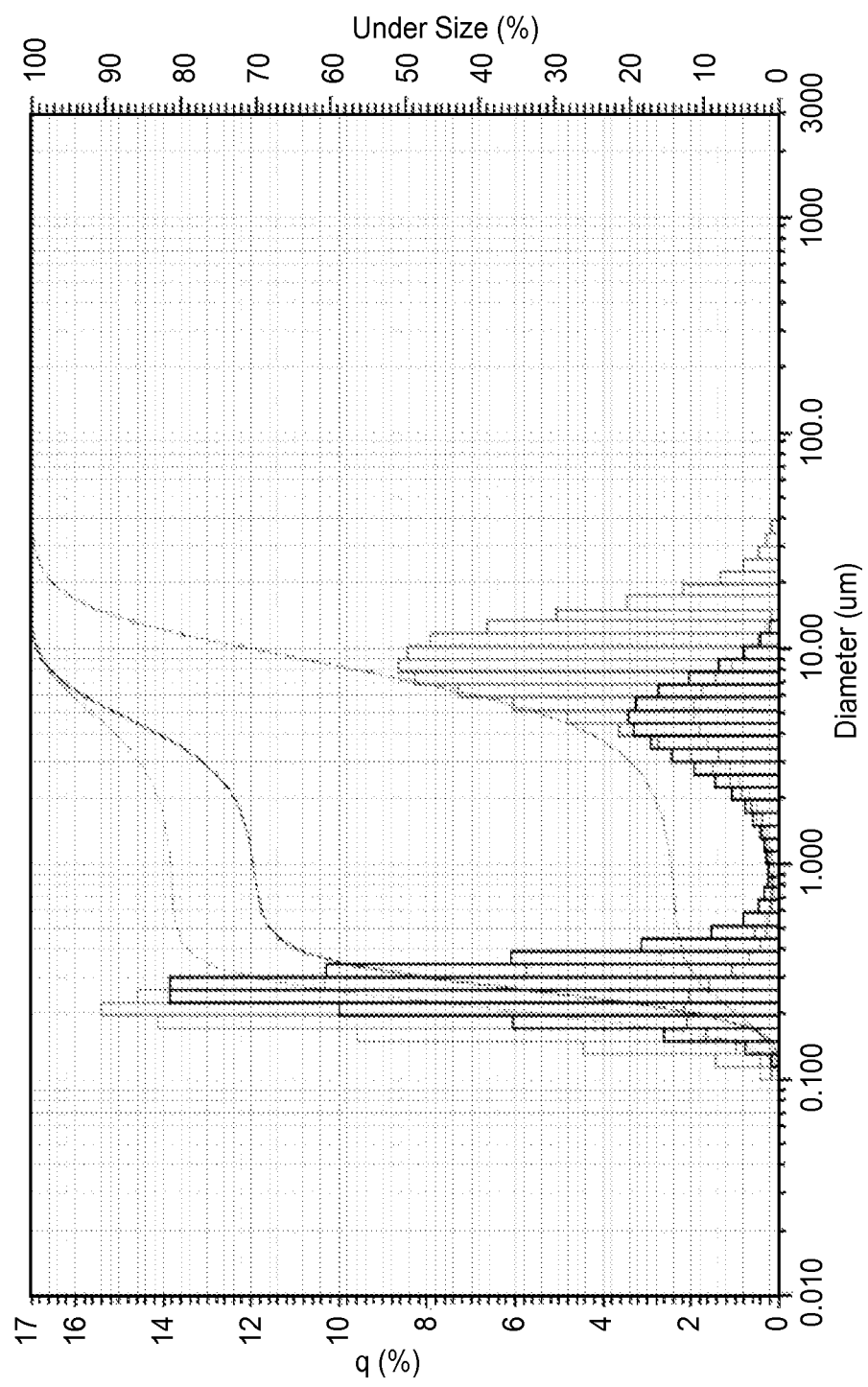
FIG. 2 is a graph depicting Al Doped ZnO particle size distribution showing effects of sonication causing deagglomeration.

In the following description, reference is made to the accompanying drawings that forms a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

The term "uncolored," such as in reference to granules or roofing granules, can be essentially white granules that are not designed to have specific absorption in the visible region of the solar spectra, as would be used to create a desired color appearance other than white.

The term "low solar absorption" can refer to materials that primarily reflect or transmit a large fraction of the total solar spectrum. Such a material would therefore primarily reflect or transmit most of the visible and near IR spectrum. In embodiments, a functional amount of a low solar absorption material (such as a layer of granules of base rock or coated base rock, or a thin layer of a granule coating material) would absorb less than 50%, preferably less than 30%, and optimally less than 20% of the total solar spectrum.

A solar opaque material is one that has low transmission of the total spectra. When a material is both solar opaque and has low solar absorption, it has high total reflectivity of the solar spectrum. Preferably, a functional amount of a solar opaque material (such as a layer of granules of base rock or coated base rock, or a thin layer of a granule coating material) would transmit less than 60%, more preferably less than 40%, and optimally less than 30% of the total solar spectrum.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Higher performance white granules can be used for commercial bitumen roofs. Granules that enable roofs with an initial TSR value of at least 0.70 of the total solar spectrum can meet new building energy rating requirements, resulting in considerably increased value of the roofing product. The granules themselves optimally have extremely high reflectivity, as there can be losses from granule post treatments and incomplete coverage of bitumen surface. Granule cup reflectivity requirements can be as high as about 78% to about 85%.

Three characteristics of ultra-white granules can include sufficiently high scattering power, sufficiently low absorption, and high UV blocking. Scattering power can be controlled by refractive index contrast and particle size. Titania can be an ideal pigment based on its high refractive index and low absorption. However, due to cost considerations, titania can be present in an amount which typically does not exceed two to three 10-30 µm pigment layers with moderate to high titania loading. This can be inadequate to fully hide a conventional base rock granule. Transparent granules can enable better coating utilization, but do not contribute additional scattering or UV absorption. Optimum utilization of titania can result from particle/aggregate size tailored to the solar spectrum and uniform distribution on the granules.

Other approaches to enhanced scattering include the development or trapping of light scattering pores, lowering the refractive index of the binder matrix, or using lower cost pigments (such as, for example, alumina) that enhance overall scattering due to the ability to use larger quantities, trap small pores, or promote uniform coatings. Sufficiently low absorption opaque base rock can contribute to total scattering power, either in combination with coatings or as a monolithic granule if sufficiently reflective. Other approaches to white opaque base include bonded alumina, devitrified glass, white marble, and white cement.

Light can be lost to absorption in the pigment layer, the granule, or in the bitumen after transmission through the granule. The latter can be controlled by scattering power as described above. The former can be minimized by eliminating light absorbing components such as, for example, standard clay. Colloidal silica has been shown to be an alternate heat curing agent to clay. Pigment subtleties, such as, for example, the presence of an organic surface treatment, can lead to absorption after heat treatment. Absorbing base rock can be replaced with transparent or low absorption opaque granules, unless the coating essentially fully hides the granule.

UV blocking can be accomplished by absorption in the base rock for conventional granules. For high TSR granules, UV reflection can be preferred versus absorption, although both could be used. Generally, an optimum particle size for UV scattering is smaller than for the remaining solar spectra, so inclusion of and/or preferential location of small particles in an outer layer can improve the fraction scattered. The use of pigments that are both good scatterers and UV absorbers (such as, for example, titania) is beneficial. Certain pigment, such as, for example, zinc oxides are moderately good scatterers and more UV absorbing in certain wavelength ranges (340-380 nm) than titania. Including UV absorbers in the base rock enables scattering from the coating followed by absorption of remaining UV light. Synthesized granules, such as, for example, custom glass, glass-ceramic, bonded alumina, or white cement based materials, allow for the incorporation of UV absorbers. With multiple coats of applied pigmented metal silicate/clay ceramic coatings, the UV transmission of a high silica granule can be cut down to lower levels. In the first two examples below, the light transmission is cut below the 5% threshold after 2 or 3 coats (depending on the composition of the coating) and the TSR of these granules is higher than the same formulation on a more absorptive standard raw rock.

Example 1

Ultra White Roofing Granules

In this example, each coat was mixed and fired to 870° F. onto quartz base rock from Black Bull Resources (Shelburne, Nova Scotia, Canada) using the formulation described in Table 1. The comparative samples fired on 3M raw rock used the same formulation with the slight difference in the first coat using 5 lbs/ton less titanium dioxide. The resulting color (as measured using a LabScan XE with a D65 light source and a 10 degree CIE standard observer) and TSR is listed in Tables 2 and 3 and plotted in FIG. 1. Table 2 also gives the light transmission results. TSR was measured using a Devices and Services Solar Spectrum Reflectometer (v5) using 1.5 air mass setting. The Light Transmission was measured using a full spectrum flood lamp with a 5850 light filter (for wavelengths ~330 nm to ~480 nm). Individual granules are placed in a 10 by 10 array and film was exposed with any light that is transmitted through the granules. In this example, acceptable light transmission is achieved after the $2^{nd}$ coat.

TABLE 1

Formula used on Black Bull quartz base rock for each coating. The formula used on the 3M raw rock is the same except that the $1^{st}$ coat used 15 lbs/ton titanium dioxide instead of 20 lbs/ton.
Coating Formulation

| RM 11-Digit No. | RM Name | lbs/ton |
| --- | --- | --- |
| 11-0000-7234-5 | PD sodium silicate | 63.00 |
|  | Water | 20.00 |
| 11-0002-6169-0 | CR800 titanium dioxide | 20.00 |
| 11-0002-9619-1 | Borax 5 Mol | 3.00 |
| 11-0000-7240-2 | B-3 Bag Clay | 30.00 |

TABLE 2

Color and TSR results for each coat on the Black Bull quartz base (results reported are an average of 4 samples).

| Sample | L* | a* | b* | Reflectivity % | Light Transmission |
| --- | --- | --- | --- | --- | --- |
| Raw Rock | 85.32 | 0.73 | 5.12 | 72.1 | 93% |
| 1 Coat | 80.13 | 1.36 | 5.85 | 63.1 | 59% |
| 2 Coats | 79.67 | 0.99 | 4.35 | 60.7 | 4% |
| 3 Coats | 79.80 | 0.66 | 3.56 | 59.5 | 2% |

TABLE 3

Color and TSR results for each coat on the 3M raw rock samples (3 replicates).

|  | L* | a* | b* | Reflectivity % |
| --- | --- | --- | --- | --- |
| Sample 1 |  |  |  |  |
| 1 Coat | 66.08 | −0.44 | −0.35 | 30.5 |
| 2 Coats | 75.45 | −0.63 | 0.40 | 42.4 |
| 3 Coats | 78.23 | −0.44 | 1.75 | 48.7 |
| 4 Coats | 79.85 | −0.27 | 2.52 | 53.0 |
| Sample 3 |  |  |  |  |
| 1 Coat | 65.50 | −0.51 | −0.70 | 29.7 |
| 2 Coats | 75.18 | −0.65 | 0.32 | 42.2 |

TABLE 3-continued

Color and TSR results for each coat on the 3M raw rock samples (3 replicates).

|  | L* | a* | b* | Reflectivity % |
|---|---|---|---|---|
| 3 Coats | 78.30 | −0.45 | 1.65 | 48.8 |
| 4 Coats | 79.79 | −0.30 | 2.45 | 52.6 |
| Sample 11 | | | | |
| 1 Coat | 66.73 | −0.54 | −0.66 | 31.1 |
| 2 Coats | 75.80 | −0.69 | 0.35 | 42.8 |
| 3 Coats | 78.61 | −0.45 | 1.80 | 49.5 |
| 4 Coats | 79.70 | −0.20 | 2.64 | 52.8 |

FURTHER EXAMPLES

Coating components

| Pigment | Manufacturer | Location | Grade | Part. Size Dist. (μm) | % Primary Oxide | Phase | Surface Coating |
|---|---|---|---|---|---|---|---|
| $TiO_2$ | Kronos | Houston, TX | 3025 | 0.3-100 | 99 | Rutile | None |
| $TiO_2$ | Dupont | Wilmington, DE | R101 | 0.32 | 97 | Rutile | 1.7 wt % $Al_2O_3$ |
| TiO2 | Precolor | Prague, CZ | R200M | 0.45 | 99.5 | Rutile | Organic |
| ZnO | Kadox | Monaca, PA | 911 | 0.12 | 99.9 | Wurtzite | None |
| Al2O3 | Alcan | Saguenay-Lac-St-Jean, QC | AC34 | 0.5-70 | 99.6 | NaAl2O3 | None |
| AlSil | 20 Microns | Vadodara, Gujarat, India | ZX | −325 Mesh | 100 | AlSi Extender | None |

| Component | Manufacturer | Location | Grade | Part. Size Dist. (μm) | % Primary Oxide | Phase |
|---|---|---|---|---|---|---|
| Coll. $SiO_2$ | Nalco | Naperville, IL | 1130 | 0.008 | 30 | nano |
| Coll. $SiO_2$ | Nalco | Naperville, IL | 2326 | 0.005 | 15 | nano |
| Coll. $SiO_2$ | Nalco | Naperville, IL | 2327 | 0.02 | 40 | nano |
| Kaolin | Laguna | City of Industry, CA | B-3 | 0.1-30 | 100 | clay |
| NaSi | PQ Corp | Valley Forge, PA | PD | 3.22 $SiO_2/Na_2O$ | 39 | Sol |
| KBF4 | Glenn Corp | Lake Elmo, MN | — | — | 100 | — |

White Pigments: Light Scattering Analysis:

Understanding the effect of particle size and particle state on scattering is critical to achieve maximum TSR. Below are examples of particle size measurements for light scattering techniques.

Figure 3:
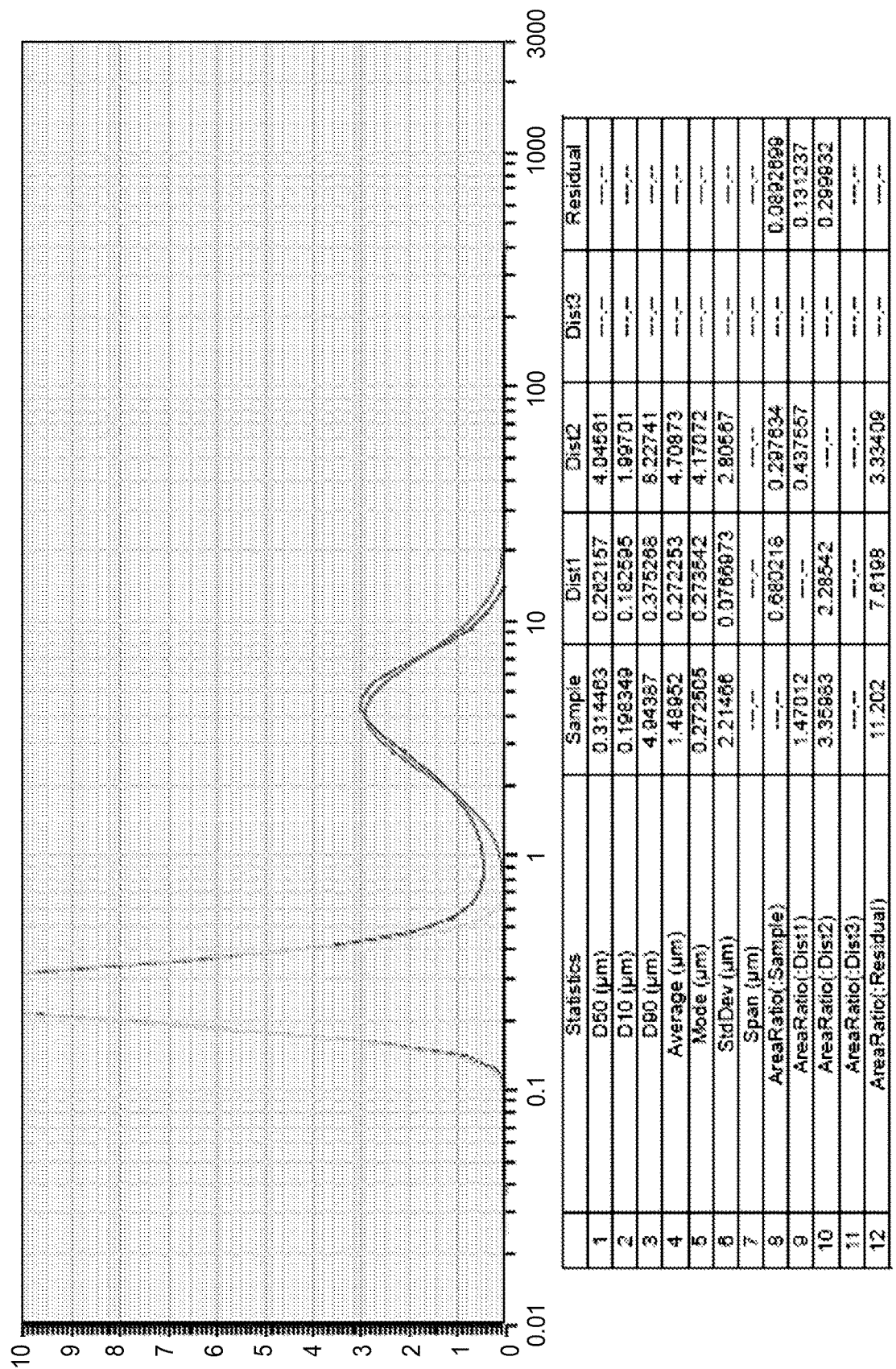
FIG. 3 is a graph depicting Al-Doped ZnO Peak fit summary.
Figure 4:
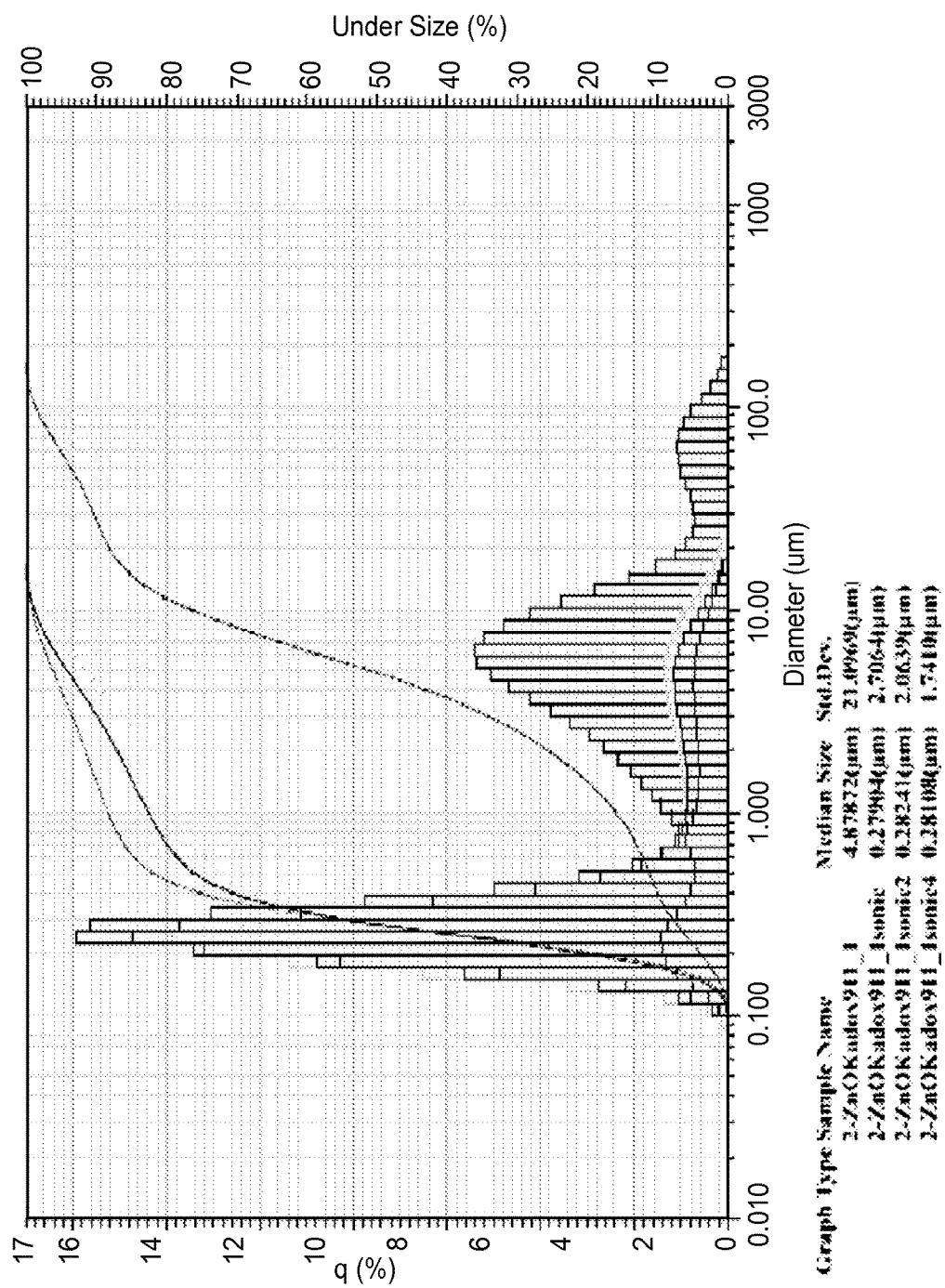
FIG. 4 is a graph depicting Kadox 911 ZnO particle size distribution showing effects of sonication causing deagglomeration.
Figure 5:
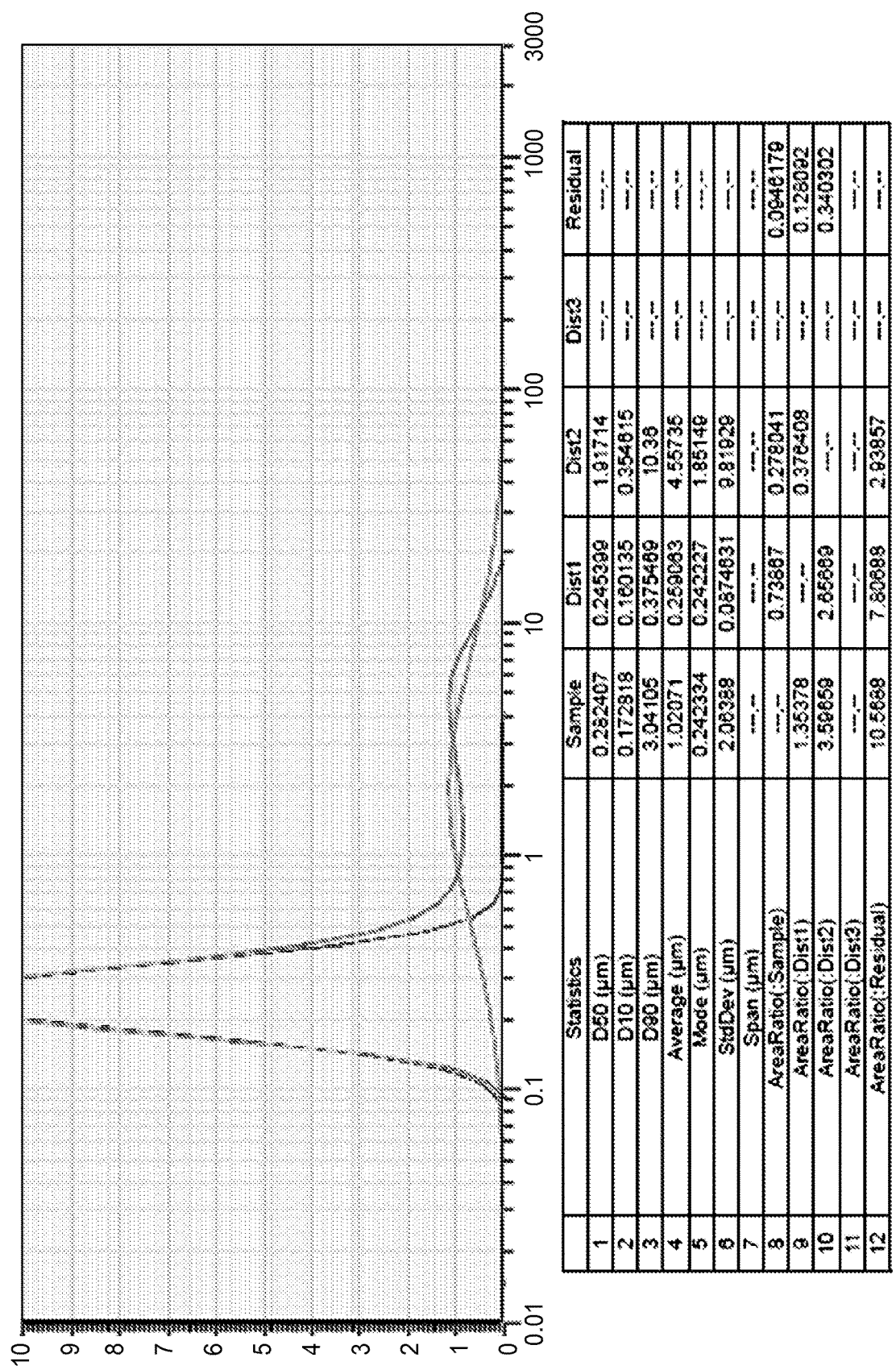
FIG. 5 is a graph depicting Kadox 911 ZnO Peak fit summary.

Al Doped ZnO-Sonication causes the larger agglomerated particles between 4 and 10 um to break into particles in the 200 nm size range. The graph in FIG. 3 summarizes the peak fit for the two modes in the Al doped ZnO after 1 minute of sonication. The sample has a peak at about 260 nm and at about 4 um. The Kadox 911 exhibits very similar behavior to that of the Al-doped ZnO sample see FIGS. 4 and 5. Note that the peak fit data is for the sample after 2 minutes of sonication and the separation between the two modes is less distinct.

Figure 6:
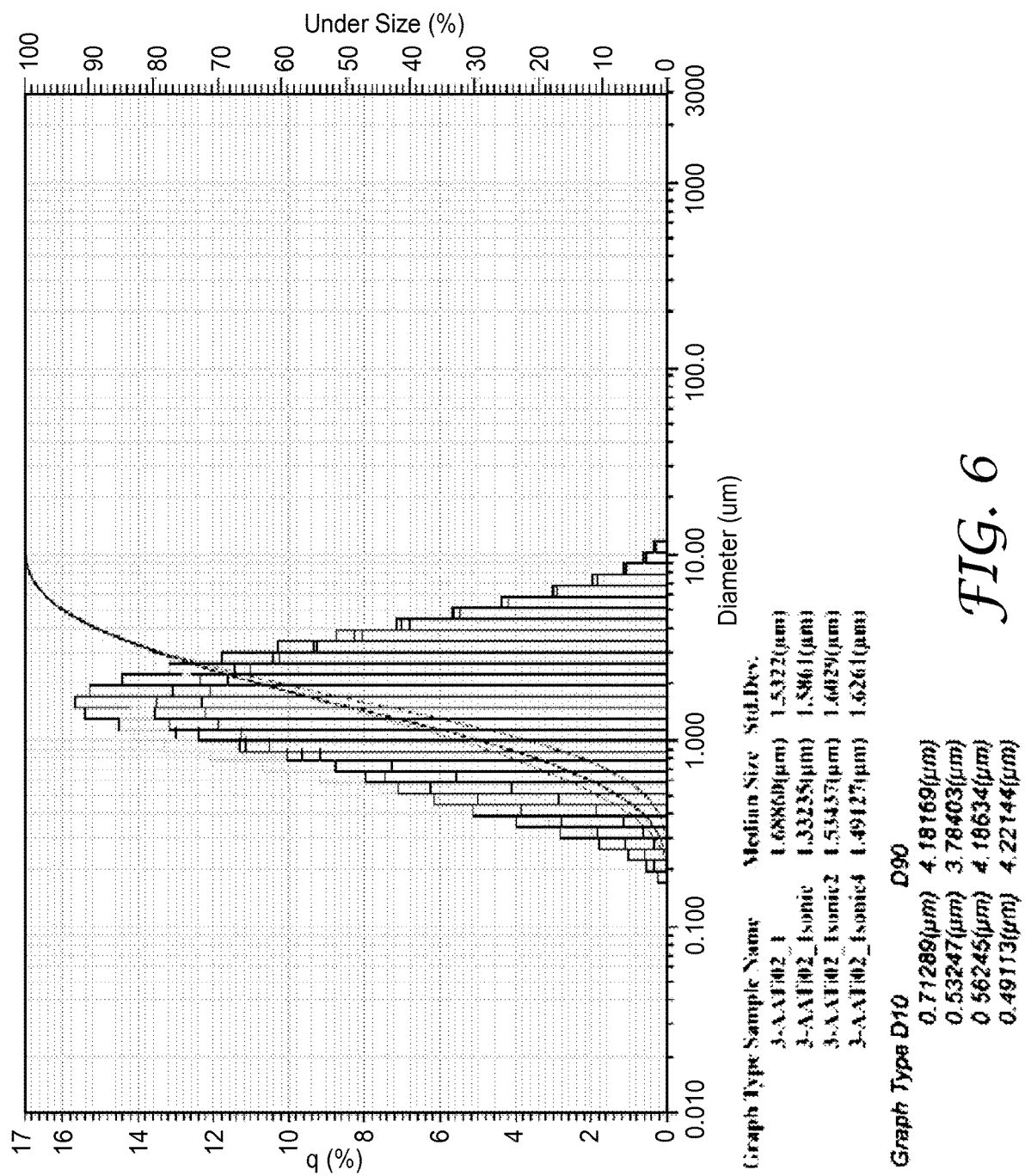
FIG. 6 is a graph depicting AA-TiO2 particle size distribution showing no significant change in response to sonication.
Figure 7:
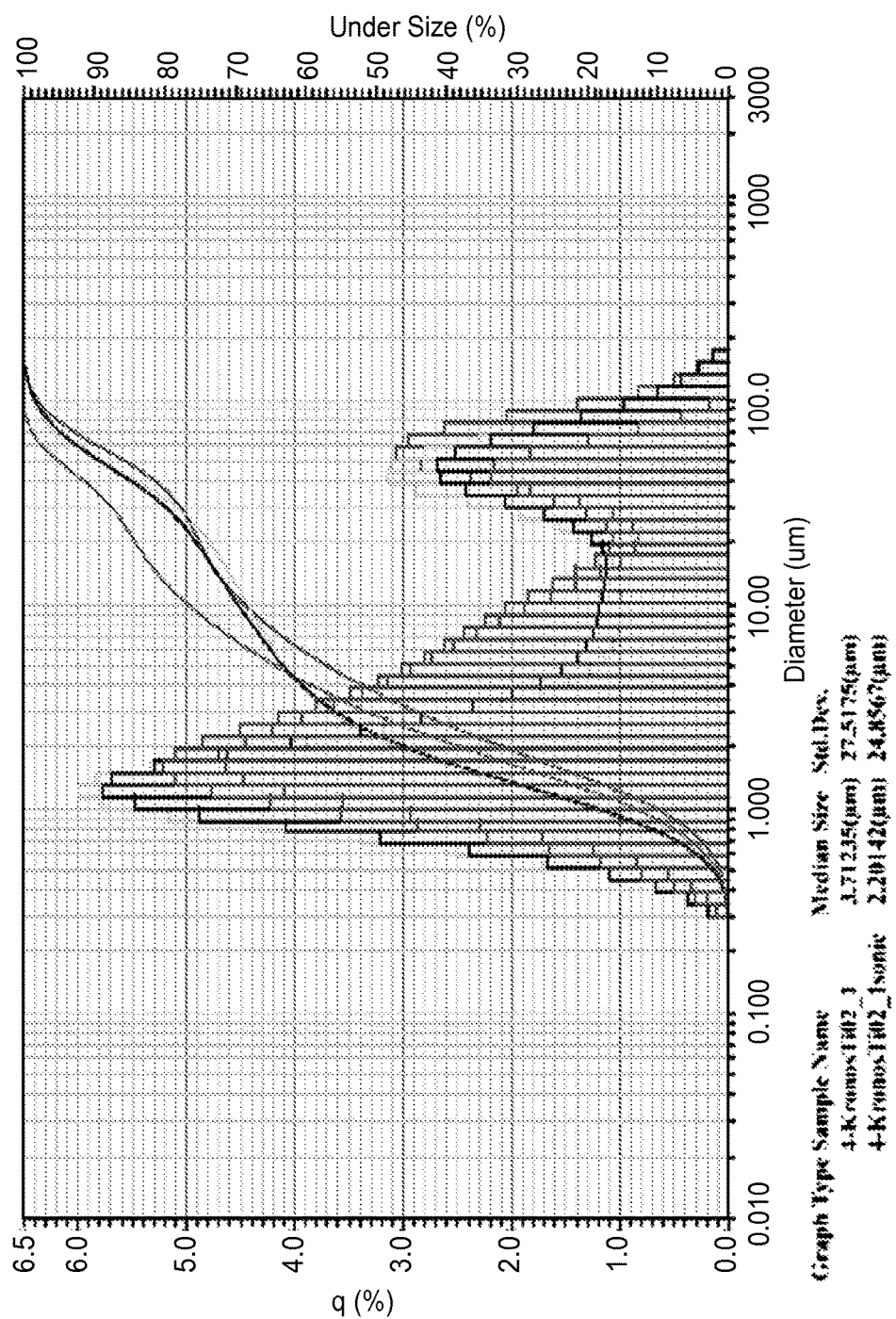
FIG. 7 is a graph depicting Kronos-TiO2 particle size distribution showing no significant change in response to sonication but exhibiting a bi-modal distribution.

The TiO2 samples exhibit a much larger overall particle size distribution. Sample AA-TiO2 exhibits a normal single mode distribution that is unaffected by sonication (see FIG. 6). The Kronos TiO2 sample also appears to be generally unaffected by sonication but exhibits a distinct bi-modal distribution (FIG. 7). The major mode is at about 1.4 um with a somewhat smaller mode at about 34.5 um.

Base Rock Materials

| | Minerals | | | | | | | | | | | |
|---|---|---|---|---|---|---|---|---|---|---|---|---|
| Sample ID | SiO2 wt. % | Al2O3 wt. % | Fe2O3* wt. % | MgO wt. % | MnO wt. % | CaO wt. % | TiO2 wt. % | Na2O wt. % | K2O wt. % | P2O5 wt. % | LOI wt. % | Ba ppm |
| 96-11GL-W | 70.26 | 13.93 | 2.94 | 0.63 | 0.04 | 1.33 | 0.49 | 3.90 | 3.74 | 0.02 | 1.88 | >800 |
| 96-11GL-B | 50.63 | 11.62 | 11.36 | 8.92 | 0.18 | 11.08 | 0.93 | 1.73 | 0.43 | 0.07 | 0.55 | 105.00 |
| 96-11GL-C | 69.93 | 13.78 | 3.86 | 0.82 | 0.07 | 2.84 | 0.43 | 3.43 | 3.20 | 0.05 | 0.46 | >800 |
| 96-11GL-L | 62.42 | 18.10 | 3.44 | 0.78 | 0.18 | 1.89 | 0.96 | 6.31 | 6.05 | 0.16 | 0.73 | >800 |

Sample Description
96-11GL-W Wausau: 11-grade granule, crushed in the geology lab, from plant production November 1996
96-11GL-B Belle Mead: 11-grade granule, crushed in the geology lab, from plant production November 1996
96-11GL-C Corona: 11-grade granule, crushed in the geology lab, from plant production November 1996
96-11GL-L Little Rock: 11-grade granule, crushed in the geology lab, from plant production November 1996
*Note:
Total iron (FeO and Fe2O3) reported as Fe2O3
Analyses completed by ACTLABS, Inc., Wheat Ridge, Colorado, Nov. 19, 1997 by the ICP method.

Quartz T-Grade Quartz is left over stock from 3M's color quartz production.

Recycled Glass 8 grade recycle glass was broken clear bottle glass obtained from E-Cullet (Saint Paul, Minn.) and crushed/sieved at bldg. 30.
    Abrasive G14 glass is crushed light bulb glass obtained from NC Minerals of Lakeville, Minn.

Marble 9 grade commercially available marble roofing granules were obtained from Imerys (Roswell, Ga.).

Custom Fused Materials 1200 frit has standard 3M bubble glass chemistry. The glass is melted, fritted, and then devitrified in a belt furnace at temps ranging from 850-9500 C for 1-4 min at a time. <0.5 wt % fumed silica is added to prevent the fritted parts from sticking together.

Coated granules were prepared by blending coatings components, then applying to granules in a rotating laboratory furnace.

Coating Notes: Colloidal silica and sodium silicate react to form a sheer thinning gel that the standard mixer blades only stir the bottom of making pigment distribution difficult. An air prop with a jiffy mixer attachment is used instead for the mixing so that the coating slip can be more controllably mixed. Clay based binders made by both methods are identical.

Other sample types were made as needed to analyze optical and chemical properties of the various components of interest. These included (coated slides, granules comprised of only coating material, actual shingles)

Performance of Roofing Materials Based on Ultra-White Granules

Performance is affected by several factors that are difficult to experimentally separate. For high TSR (total solar reflectivity), key factors include low absorbance (vis and IR), high scattering power (vis and IR), UV blocking (scattering or absorption), and good bitumen coverage (granule shape and size). Measurements and experiments to characterize and optimize these functions are described below. It is believed the materials and experiments below provide a path to a commercial granule bitumen roof with the desired TSR (0.70 of the total solar spectrum). Laboratory shingles do not necessarily meet this target due to non-optimum shingle coverage and packing, non-optimum granule surface treatment, or other factors.

Coatings on slides—as a function of thickness, these help determine scattering power via identification of the required thickness to provide maximum reflection. At sufficient thickness—they also provide information on relative absorption. However the maximum reflectivity differs from the entitlement value for coated granules, because the rough surface formed by granules has more bounces for absorption, and therefore a lower maximum TSR than for thickly coated slides.

Cup brightness values—These can be measured for base granules, coated granules, and granules fabricated from coating materials (granules of coating). Cup brightness provides a TSR value that is influenced by relative absorption with the appropriate magnification caused by roughness. For coated granules with absorptive base rock, primarily the top layer scatters light, so the result is very similar to shingle properties. For white granules with clear or white base rock, cup TSR is often enhanced because multiple granule layers counter act the absence of sufficient scattering power.

Granule mono-layers (shingles or black tape)—these samples are closest to real functional performance, since the surface has real world roughness, and lack of scattering power causes light loss to the black backing. Granule packing, size, and shape influence this test (and real world performance) however, so the tests above are often needed to separate materials performances from granule shape factors.

Performance of Coatings

A. Examples of Low Loss Binder Systems:

|  | RunOrder | | | | | |
|---|---|---|---|---|---|---|
|  | DOE 1 | DOE 11 | DOE 13 | DOE 14 | DOE 15 | 8-29-11-6E |
| Clay Binder System | | | | | | |
| 3025 lb/ton | 45.00 | 90.00 | 50.63 | 60.00 | 56.25 | 135.00 |
| RCL9 lb/ton | 0.00 | 0.00 | 28.13 | 15.00 | 11.25 | 0.00 |
| ZnO 911 lb/ton | 22.50 | 0.00 | 5.63 | 15.00 | 11.25 | 0.00 |
| AlSil lb/ton | 22.50 | 0.00 | 5.63 | 0.00 | 11.25 | 0.00 |
| B3 clay | 30.00 | 30.00 | 30.00 | 30.00 | 30.00 | 15.00 |
| PD sodium silicate | 63.00 | 63.00 | 63.00 | 63.00 | 63.00 | 50.00 |
| water | 20.00 | 20.00 | 20.00 | 20.00 | 20.00 | 20.00 |
| amt/1 kg rock | 203.00 | 203.00 | 203.00 | 203.00 | 203.00 | 220.00 |
| Colloidal $SiO_2$ System | | | | | | |
| 3025 lb/ton | 45.00 | 90.00 | 50.63 | 60.00 | 56.25 | 135.00 |
| RCL9 lb/ton | 0.00 | 0.00 | 28.13 | 15.00 | 11.25 | 0.00 |
| ZnO 911 lb/ton | 22.50 | 0.00 | 5.63 | 15.00 | 11.25 | 0.00 |
| AlSil lb/ton | 22.50 | 0.00 | 5.63 | 0.00 | 11.25 | 0.00 |
| 2326 Nalco | 200.00 | 200.00 | 200.00 | 200.00 | 200.00 | 100.00 |
| PD sodium silicate | 63.00 | 63.00 | 63.00 | 63.00 | 63.00 | 50.00 |
| water | 0.00 | 0.00 | 0.00 | 0.00 | 0.00 | 0.00 |
| amt/1 kg rock | 353.00 | 353.00 | 353.00 | 353.00 | 353.00 | 285.00 |
| TSR | | | | | | |
| Clay Flat Black | 0.650 | 0.615 | 0.636 | 0.644 | 0.647 | 0.677 |
| 2326 Flat Black | 0.675 | 0.625 | 0.678 | 0.655 | 0.666 | 0.639 |
| 2326% Improvement | 3.74 | 1.68 | 6.71 | 1.71 | 2.89 | −5.52 |
| Clay Cup | 0.768 | 0.750 | 0.760 | 0.758 | 0.760 | 0.785 |
| 2326 Cup | 0.831 | 0.770 | 0.815 | 0.816 | 0.830 | 0.799 |
| 2326% Improvement | 8.29 | 2.67 | 7.28 | 7.70 | 9.26 | 1.83 |

B. Examples of Transparent Baserock and Cup Brightness Properties

TABLE 6

| Cup TSR and Color for transparent base rocks | | | | | | |
|---|---|---|---|---|---|---|
| Sample | CO raw rock | White G18 | Green G18 | T-Grade | 1200 1 Pass | 1200 Multipass |
| TSR | 0.111 | 0.574 | 0.271 | 0.604 | 0.625 | 0.680 |
| L* | 41.14 | 81.4 | 62.63 | 78.01 | 83.723 | 89.267 |
| a* | −0.6 | −0.46 | −3.92 | 1.41 | −3.050 | −4.103 |
| b* | 1.97 | 4.52 | 18.92 | 5.92 | 0.397 | −0.213 |

C. Examples of Monolithic Granules/Opaque Baserock and Cup Brightness Properties:

TABLE 7

Cup TSR values of monolithic granules

| Sample | 1200 850C 1 Pass | 1200 850C Multipass | Marble |
|---|---|---|---|
| Avg TSR | 0.625 | 0.680 | 0.594 |
| L* | 83.74 | −3.09 | 0.37 |
| a* | 86.59 | −3.53 | 0.10 |
| b* | 86.59 | −3.53 | 0.10 |

TABLE 8

TSR values of monolayers of granules on tape

| | Black Tape | White Tape |
|---|---|---|
| Avg TSR | 0.059 | 0.807 |

| Marble on White | Marble on Black | Quartz on Black | Quartz on White | Abra G14 on Black | Abra G14 on White |
|---|---|---|---|---|---|
| 0.666 | 0.425 | 0.268 | 0.727 | 0.199 | 0.730 |

| Abra G14 on Black | Abra G14 on White | 1200 1Pass Black | 1200 1Pass on White | 1200 Multi Pass Black | 1200 Multi Pass White |
|---|---|---|---|---|---|
| 0.199 | 0.730 | 0.244 | 0.750 | 0.335 | 0.755 |

1200 frit is bubble glass that has been partially nucleated at 850° C. for 1-3 minutes. Multipass is 6 passes varying in length from 1-3 minutes. Black is 3M 610 Vinyl Tape while White is TSSD $TiO_2$ loaded patch brightness tape.

D. Examples of Coated Granules

TABLE 9

Comparison of TSR values of high TSR granules using different $TiO_2$ pigments

| | R101 Corona | R101 Abrasive G14 | R200M Abrasive G14 | Kronos 3025 Abrasive G14 | R200M Abrasive G14 |
|---|---|---|---|---|---|
| Oct. 25, 2011 | 10-25-11-7 | 10-25-11-9 | 10-25-11-10 | 10-25-11-11 | 10-25-11-12 |
| PD NaSi | 44.3 | 44.3 | 44.3 | 44.3 | 22.0 |
| 2326 Coll. SiO2 | 66.5 | 66.5 | 66.5 | 66.5 | 44.1 |
| DI H2O | 0.0 | 0.0 | 0.0 | 0.0 | 4.4 |
| TiO2 | 45.0 | 45.0 | 45.0 | 45.0 | 59.5 |
| Batch Applied | 155.7 | 155.7 | 155.7 | 155.7 | 130.0 |
| % Solids | 0.46 | 0.46 | 0.46 | 0.46 | 0.58 |
| % Binder | 0.18 | 0.18 | 0.18 | 0.18 | 0.12 |
| NaSi:React Ratio | 1.750 | 1.750 | 1.750 | 1.750 | 1.311 |

| Coatings as batched | Corona | Abrasive G14 | Abrasive G14 | Abrasive G14 | Abrasive G14 |
|---|---|---|---|---|---|
| Oct. 25, 2011 | 10-25-11-7 | 10-25-11-9 | 10-25-11-10 | 10-25-11-11 | 10-25-11-12 |
| PD NaSi | 64.0 | 64.0 | 64.0 | 64.0 | 38.1 |
| 2326 Coll. SiO2 | 96.0 | 96.0 | 96.0 | 96.0 | 76.3 |
| DI H2O | 0.0 | 0.0 | 0.0 | 0.0 | 7.6 |
| TiO2 | 65.0 | 65.0 | 65.0 | 65.0 | 103.0 |
| Batch Weight | 225.0 | 225.0 | 225.0 | 225.0 | 225.0 |
| TiO2 g per Coat | 45 | 45 | 45 | 45 | 59.51014752 |
| Avg. TSR 3 Coats | 0.544 | 0.611 | 0.511 | 0.735 | 0.735 |

| | 7 | 9 | 10 | 11 | 12 |
|---|---|---|---|---|---|
| L* | 82.61 | 83.28 | 77.88 | 88.87 | 89.78 |
| a* | −0.62 | −0.28 | −0.21 | −0.55 | −0.32 |
| b* | 1.08 | 1.64 | 0.90 | 5.51 | 3.42 |

TABLE 10

Comparison of TSR values of high TSR granules using different TiO₂ pigments (cub brightness TSR)

| TiO2 | Kronos 3025 | Kronos 3025 | Kronos 3025 | Kronos 3025 | Kronos 3025 |
|---|---|---|---|---|---|
| Granule | Marble | T-Quartz | Abrasive G14 | T-Quartz | T-Quartz |
| Nov. 22, 2011 | 12-22-11-3 | 12-5-11-1 | 10-25-11-11 | 8-29-11-6D | 8-29-11-6E |
| PD NaSi | 88.5 | 88.5 | 88.6 | 50 | 50.0 |
| Kaolin B-3 | 0.0 | 0.0 | 0.0 | 0.0 | 0.0 |
| 2326 Coll. SiO2 | 132.9 | 132.9 | 133.0 | 100 | 100.0 |
| DI H2O | 0.0 | 0.0 | 0.0 | 10.0 | 10.0 |
| ZnO LS | 0.0 | 0.0 | 0.0 | 67.5 | 33.8 |
| TiO2 | 90.0 | 90.0 | 90.0 | 67.5 | 101.3 |
| Batch | 311.4 | 311.4 | 311.6 | 295.0 | 295.1 |
| Amount of H20 | 166.6 | 166.6 | 166.7 | 125.3 | 125.3 |
| Amount of Binder | 54.8 | 54.8 | 54.9 | 34.7 | 34.7 |
| NaSi:React Ratio | 1.750 | 1.750 | 1.750 | 1.313 | 1.313 |
| Total Applied | 103.82 | 155.72 | 155.80 | 147.50 | 147.55 |
| AVG 3 Coat TSR | 0.719 | 0.67 | 0.735 | 0.775 | 0.779 |

TABLE 11

Comparison of TSR values and alkalinity of low dust formulations blending multiple metal-silicate solutions with different colloidal silica levels on Corona

| Apr. 12, 2012 | 1 | 2 | 3 | 4 | 5 | 6 | 7 | 8 |
|---|---|---|---|---|---|---|---|---|
| TiO2 | 22.5 | 33.8 | 45.0 | 22.5 | 22.5 | 22.5 | 22.5 | 22.5 |
| Alsil | 22.5 | 11.3 | 0.0 | 22.5 | 22.5 | 22.5 | 22.5 | 22.5 |
| NaSi | 63.0 | 63.0 | 63.0 | 63.0 | 63.0 | 63.0 | 28.0 | 28.0 |
| Kasil 6 | 0.0 | 0.0 | 0.0 | 0.0 | 0.0 | 0.0 | 35.3 | 35.3 |
| Nalco 2327 | 75.0 | 75.0 | 75.0 | 37.5 | 37.5 | 37.5 | 37.5 | 75.0 |
| Water | 0.0 | 0.0 | 0.0 | 0.0 | 10.0 | 20.0 | 0.0 | 0.0 |
| Total | 183.0 | 183.0 | 183.0 | 145.5 | 145.5 | 145.5 | 145.8 | 183.3 |
| APPLY | 91.5 | 91.5 | 91.5 | 72.8 | 72.8 | 72.8 | 72.9 | 91.7 |
| Apply | 91.5 | 91.5 | 91.5 | 72.8 | 72.8 | 72.8 | 72.9 | 91.7 |
| Batch | 1 | 2 | 3 | 4 | 5 | 6 | 7 | 7 |
| TiO2 | 18.0 | 27.0 | 36.0 | 18.0 | 18.0 | 18.0 | 18.0 | 18.0 |
| Alsil | 18.0 | 9.0 | 0.0 | 18.0 | 18.0 | 18.0 | 18.0 | 18.0 |
| NaSi | 50.4 | 50.4 | 50.4 | 50.4 | 50.4 | 50.4 | 22.4 | 22.4 |
| Kasil 6 | 0.0 | 0.0 | 0.0 | 0.0 | 0.0 | 0.0 | 28.2 | 28.2 |
| Nalco 2327 | 60.0 | 60.0 | 60.0 | 30.0 | 30.0 | 30.0 | 30.0 | 60.0 |
| Water | 0.0 | 0.0 | 0.0 | 0.0 | 8.0 | 16.0 | 0.0 | 0.0 |
| Total | 146.4 | 146.4 | 146.4 | 116.4 | 116.4 | 116.4 | 116.6 | 146.6 |
| Apply | 91.5 | 91.5 | 91.5 | 72.8 | 72.8 | 72.8 | 72.9 | 91.7 |
|  | Corona | Corona | Corona | Corona | Corona | Corona | Corona | Corona |
| Alkalinity | 3.624 | 3.736 | 4.722 | 4.502 | 4.188 | 3.814 | 4.58 | 4.018 |
| Washed Alk | 3.342 | 3.288 | 3.764 | 3.386 | 3.746 | 3.648 | 4.622 | 3.544 |
| Cup: −16 + 20 | 0.302 | 0.320 | 0.342 | 0.309 | 0.303 | 0.301 | 0.292 | 0.298 |
| Flat: −16 + 20 | 0.259 | 0.273 | 0.295 | 0.260 | 0.261 | 0.261 | 0.244 | 0.253 |
| Flat: Full | 0.261 | 0.278 | 0.296 | 0.273 | 0.264 | 0.281 | 0.253 | 0.280 |
| Flat: Full | 0.881 | 0.905 | 0.900 | 0.911 | 0.894 | 0.921 | 0.901 | 0.919 |
| Flat: −16 + 20 | 0.872 | 0.852 | 0.862 | 0.861 | 0.864 | 0.875 | 0.836 | 0.860 |
| L* | 63.88 | 65.85 | 67.40 | 64.14 | 63.63 | 63.51 | 62.48 | 63.35 |
| a* | 0.26 | 0.13 | 0.06 | 0.28 | 0.30 | 0.32 | 0.27 | 0.23 |
| b* | 2.07 | 2.20 | 2.15 | 2.29 | 2.35 | 2.39 | 2.31 | 2.07 |

TABLE 12

Comparison of TSR values and alkalinity of low dust formulations blending multiple metal-silicate solutions with different colloidal silica levels on Silmer white (0.78 TSR) base.

| Apr. 17, 2012 | Mini-Grain 1 | 1 | 2 | 3 | 4 | 5 | 6 | 7 | 8 | 9 | 10 |
|---|---|---|---|---|---|---|---|---|---|---|---|
| TiO2 3025 |  | 22.5 | 22.5 | 22.5 | 22.5 | 22.5 | 22.5 | 22.5 | 0.0 | 0.0 | 0.0 |
| TiO RCL9 |  | 0.0 | 0.0 | 0.0 | 0.0 | 0.0 | 0.0 | 0.0 | 0 | 0 | 22.5 |
| Alsil |  | 22.5 | 22.5 | 22.5 | 22.5 | 22.5 | 22.5 | 22.5 | 0.0 | 0.0 | 22.5 |

TABLE 12-continued

Comparison of TSR values and alkalinity of low dust formulations blending multiple metal-silicate solutions with different colloidal silica levels on Silmer white (0.78 TSR) base.

| Apr. 17, 2012 | Mini-Grain 1 | 1 | 2 | 3 | 4 | 5 | 6 | 7 | 8 | 9 | 10 |
|---|---|---|---|---|---|---|---|---|---|---|---|
| NaSi | | 28.0 | 28.0 | 63.0 | 28.0 | 63.0 | 28.0 | 63.0 | 28.0 | 63.0 | 28.0 |
| Kasil 6 | | 35.3 | 35.3 | 0.0 | 35.3 | 0.0 | 35.3 | 0.0 | 35.3 | 0.0 | 35.3 |
| Nalco 2327 | | 37.5 | 37.5 | 37.5 | 75.0 | 75.0 | 37.5 | 37.5 | 37.5 | 37.5 | 37.5 |
| Total | | 145.8 | 145.8 | 145.5 | 183.3 | 183.0 | 145.8 | 145.5 | 100.8 | 100.5 | 145.8 |
| APPLY | | 72.9 | 72.9 | 72.8 | 91.7 | 91.5 | 72.9 | 72.8 | 50.4 | 50.3 | 72.9 |
| Apply | | 72.9 | 72.9 | 72.8 | 91.7 | 91.5 | 72.9 | 72.8 | 91.7 | 91.5 | 72.9 |
| Batch | | 1 | 2 | 3 | 4 | 5 | 6 | 7 | 8 | 9 | 10 |
| TiO2 | | 18.0 | 18.0 | 18.0 | 18.0 | 18.0 | 18.0 | 18.0 | 0.0 | 0.0 | 0.0 |
| TiO2 RCL9 | | 0.0 | 0.0 | 0.0 | 0.0 | 0.0 | 0.0 | 0.0 | 0.0 | 0.0 | 11.3 |
| Alsil | | 18.0 | 18.0 | 18.0 | 18.0 | 18.0 | 18.0 | 18.0 | 0.0 | 0.0 | 11.3 |
| NaSi | | 22.4 | 22.4 | 50.4 | 22.4 | 50.4 | 22.4 | 50.4 | 22.4 | 50.4 | 14.0 |
| Kasil 6 | | 28.2 | 28.2 | 0.0 | 28.2 | 0.0 | 28.2 | 0.0 | 28.2 | 0.0 | 17.7 |
| Nalco 2327 | | 30.0 | 30.0 | 30.0 | 60.0 | 60.0 | 30.0 | 30.0 | 30.0 | 30.0 | 18.8 |
| Total | | 116.6 | 116.6 | 116.4 | 146.6 | 146.4 | 116.6 | 116.4 | 80.6 | 80.4 | 72.9 |
| Apply | | 72.9 | 72.9 | 72.8 | 91.7 | 91.5 | 72.9 | 72.8 | 50.4 | 50.3 | 36.5 |
| | | Sil. MG0 | Sil. MG1 | Sil. MG0 | Sil. MG0 | Sil. MG0 | 2095 | 2095 | Sil. MG0 | Sil. MG0 | Sil. MG0 |
| Alkalinity | 0.604 | 9.36 | — | 9.706 | 7.656 | 9.136 | 5.342 | 3.802 | 10.386 | 12.804 | 8.426 |
| Washed Alk | | 8.404 | — | 9.136 | 7.12 | 7.978 | | | 9.646 | 12.482 | 8.006 |
| 1x Coat Flat: Full | | 0.599 | 0.614 | 0.623 | 0.589 | 0.568 | 0.446 | 0.464 | 0.569 | 0.591 | 0.600 |
| Flat: −16 + 20 | | 0.563 | 0.590 | 0.620 | 0.588 | 0.573 | 0.409 | 0.429 | 0.566 | 0.571 | 0.574 |
| Cup: −16 + 20 | 0.789 | 0.728 | 0.771 | 0.726 | 0.723 | 0.739 | 0.602 | 0.627 | 0.758 | 0.764 | 0.750 |
| 1x Coat L* | 91.08 | 88.71 | 90.55 | 88.88 | 88.23 | 88.75 | 77.68 | 79.21 | 89.53 | 89.94 | 90.08 |
| a* | 0.47 | 0.14 | 0.30 | 0.22 | 0.19 | 0.24 | 3.52 | 3.42 | 0.71 | 0.68 | 0.03 |
| b* | 1.09 | 3.49 | 2.86 | 3.42 | 3.60 | 3.62 | 9.90 | 9.65 | 1.83 | 1.62 | 2.57 |
| 1x Pack Flat: Full | | 0.890 | 0.916 | 0.887 | 0.840 | 0.821 | 0.867 | 0.855 | 0.822 | 0.845 | 0.860 |
| Flat: −16 + 20 | | 0.835 | 0.862 | 0.916 | 0.858 | 0.832 | 0.773 | 0.785 | 0.824 | 0.816 | 0.828 |
| Est 95% pack | 0.752 | 0.694 | 0.735 | 0.692 | 0.689 | 0.705 | 0.574 | 0.598 | 0.722 | 0.728 | 0.715 |
| 3x Coat Flat: Full | | 0.616 | | 0.613 | 0.603 | 0.612 | | | | | |
| Flat: −16 + 20 | | 0.586 | | 0.584 | 0.569 | 0.581 | | | | | |
| Cup: −16 + 20 | | 0.712 | | 0.727 | 0.705 | 0.717 | | | | | |
| 3x Coat L* | | 87.62 | | 88.46 | 86.70 | 87.44 | | | | | |
| a* | | −0.02 | | −0.07 | 0.12 | 0.02 | | | | | |
| b* | | 4.34 | | 4.38 | 4.56 | 4.67 | | | | | |

TSR Cup, Shingle, Flat Black

TABLE 13

Comparison of TSR values of high TSR granules in different constructions

| Sample | 6D1 | 6D2 | 6E1 | 6E2 |
|---|---|---|---|---|
| Granule Cup TSR | 0.794 | | 0.792 | |
| Gran. + PT Cup TSR | 0.738 | | 0.736 | |
| Shingle TSR | 0.613 | 0.630 | 0.630 | 0.635 |

The post treatment required to adhere the granules to the asphalt has absorptive components that lower granule TSR values.

TABLE 14

Comparison of TSR values of high TSR granules in different constructions

| Sample | PolyFlake | Firestone | Al2O3 | 8-29-11-6D P.T. |
|---|---|---|---|---|
| Cup TSR | ? | 0.811 | 0.859 | 0.738 |
| Flat Black TSR | ? | 0.653 | ? | ? |
| Flat Black Packing % | ? | 85.0 | ? | ? |
| Shingle TSR | 0.660 | 0.705 | 0.703 | 0.613 |
| Shingle Packing % | 96.6 | 92.5 | 84.0 | 87.3 |

The polyflake and firestone materials were made by a manufacturing process that yields higher packing density than lab hand spreads are capable of achieving. Granule packing on shingle hand spreads is not easily controlled leading to lower construction TSR values than production processed shingles.

Data on Granule Durability: Boil Test, Tumble Test

TABLE 15

6 hour boil test to judge coating solubility

| Sample | 8-29-11-5C | 5C 6 Hour Boil | | 8-29-11-7F | 7F 6 hr boil |
|---|---|---|---|---|---|
| | 0.699 | 0.686 | | 0.767 | 0.76 |
| | 0.707 | 0.693 | | 0.772 | 0.76 |
| | 0.708 | 0.694 | | 0.775 | 0.751 |
| TSR Avg | 0.705 | 0.691 | TSR Avg | 0.771 | 0.757 |
| | | % Loss 1.94 | | | % Loss 1.86 |

Samples show a minimal amount of TSR drop after 6 hours in rapidly boiling water.

TABLE 16

Tumble test data on Corona rock and na-silicate infiltrated alumina

| | On −30 mesh |
|---|---|
| NaSiAl | 0.9 g |
| Corona Rock | 0.5 g |

Na-silicate infiltrated shaped alumina particles retain enough shape after firing to pass the granule tumble test.

Coating

In embodiments, a roofing article includes a substrate and a plurality of roofing granules presented on said substrate. The article can further include a coating presented on the substrate and roofing granules. Such coating can include, for example, the following materials:

Substrates.

High-performance roof coating material, obtained as "SCOTCHKOTE Poly-Tech CSM 658" and Scotchkote Poly-Tech UV both available from 3M Company, St. Paul, Minn.

Fluoro-Materials.

Material 1: 15% aqueous fluoro-urethane silane dispersion available from 3M Company as Trade name SRC220.

Silica Nanoparticles.

Nanoparticle: A 40% aqueous colloidal spherical silica dispersion (stabilized with ammonium ion, Mean Particle Diameter=20 nm), available as NALCO 2327 from NALCO Chemical Company;

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

What is claimed is:

1. A roofing granule comprising:
a low solar absorption base that absorbs less than 50% of the total solar spectrum;
and a low solar absorption and solar opaque coating presented on said base that transmits less than 60% of the total solar spectrum, said coating comprising a binder, a pigment, wherein said binder comprises about 0% by weight clay, wherein said binder comprises a curable component and a thermally reactive curing agent, wherein said curable component comprises a soluble alkali silicate;
wherein the roofing granule does not have specific absorption in the visible region of the solar spectrum,
wherein said base comprises a total solar reflectivity having a cup brightness of at least about 0.70 reflectivity and is selected from the group consisting of polycrystalline silicate, polycrystalline silica, glass ceramic, devitrified ceramic, phase-separated glass, polycrystalline fused oxide, white cement, and any combinations thereof.

2. The roofing granule of claim 1, wherein said base is white cement, said white cement comprising one or more fillers selected from the group consisting of recycled glass, engineered glass, quartz, alumina, titania, and any combinations thereof.

3. The roofing granule of claim 1, wherein said reactive curing agent comprises silica nanoparticles dispersed therein.

4. The roofing granule of claim 1, wherein said pigment is selected from the group consisting of alumina, titania, zinc oxide, UV blocking powders, and any combinations thereof.

5. The roofing granule of claim 1, wherein said coating has high reflectivity to visible and infrared (IR) light.

6. A roofing article comprising a substrate and a plurality of roofing granules according to claim 1 presented on said substrate, said article further comprising an overcoat presented on said substrate and roofing granules.

7. The roofing article of claim 6, wherein said overcoat comprises fluorinated polyurethane silane with nanosilica particles dispersed in said fluorinated polyurethane silane.

8. The roofing article of claim 6, wherein said overcoat comprises a first layer comprising acrylic and a second layer presented on said first layer, said second layer comprising fluorinated polyurethane silane with nanosilica particles dispersed in said fluorinated polyurethane silane.

9. The roofing article of claim 6, wherein said overcoat comprises a mixture of acrylic and fluorinated polyurethane silane with nanosilica particles dispersed in said fluorinated polyurethane silane.

* * * * *